Figure 1:
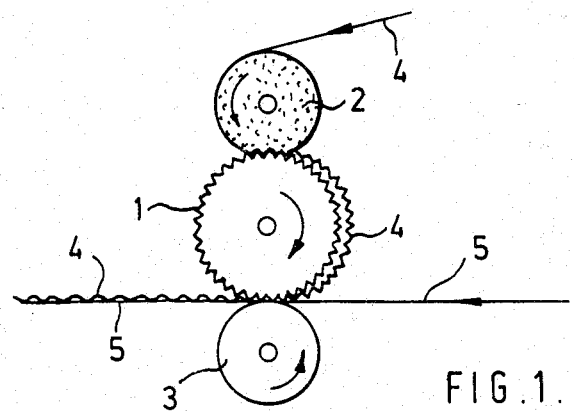

United States Patent [19]

Gatward

[11] Patent Number: 4,515,840

[45] Date of Patent: May 7, 1985

[54] SHEET MATERIAL

[76] Inventor: Douglas K. Gatward, 1212 Great Cambridge Rd., Enfield, Middlesex, England

[21] Appl. No.: 351,543

[22] Filed: Feb. 23, 1982

[30] Foreign Application Priority Data

Feb. 23, 1981 [GB] United Kingdom ............... 8105649

[51] Int. Cl.³ ..................... B32B 27/10; B65D 65/02
[52] U.S. Cl. .................................. 428/35; 229/87 F;
229/3.5 R; 383/42; 383/113; 428/137; 428/182;
428/211; 428/318.4; 428/332; 428/511
[58] Field of Search ............... 428/195, 43, 198, 211,
428/182, 184, 186, 511, 332.35, 311.1, 318.4;
206/610, 620; 229/55, 60, 3.5 R, 87 F; 383/113,
42, 81

[56] References Cited

U.S. PATENT DOCUMENTS

| | | | |
|---|---|---|---|
| 3,365,116 | 1/1968 | Ludlow | 229/55 |
| 3,505,083 | 4/1970 | Schelhorn | 428/198 |
| 4,263,360 | 4/1981 | Adelman | 428/238 |
| 4,264,672 | 4/1981 | Taylor-Brown et al. | 428/323 |

FOREIGN PATENT DOCUMENTS

| | | |
|---|---|---|
| 2163311 | 7/1973 | France . |
| 2205411 | 5/1974 | France . |
| 2034279 | 6/1980 | United Kingdom ............ 229/87 F |
| 1604830 | 12/1981 | United Kingdom . |

Primary Examiner—Paul J. Thibodeau
Attorney, Agent, or Firm—Robert T. Gammons

[57] ABSTRACT

A laminated wrapping sheet material comprising a layer of paper bonded to a layer of thermoplastic film, is formed such that a layer of paper of 15–35 gsm gauge is discontinuously bonded to a layer of thermoplastic film of 8–35 microns such that pockets of air are defined between the layers.

The sheet material is useful in the construction of a captive flap bag formed of a paper-thermoplastic film laminate and comprising two superimposed walls with thermoplastic film on the inside, closed at the bottom and on each of the two side edges, and open at the top edge, at least one wall having a reflex internal flap along the top edge sealed at each of the side edges, to define an internal inverted pocket, the two walls not being sealed to each other in the region of the pocket or pockets.

11 Claims, 3 Drawing Figures

SHEET MATERIAL

The present invention relates to sheet materials, and to bags made from sheet materials.

More particularly, in a first aspect, the present invention is concerned with an insulating sheet material for wrapping food etc., comprising a layer of paper laminated to a layer of thermoplastic film. Paper-thermoplastic film laminates are, of course, generally well known and are much used in packaging, photography and wall decoration. The laminates known in the art are, however, continuously bonded so that the film and the paper are in intimate contact, or are heavy gauge quilted materials. One noteworthy example is the flour bag of UK Pat. No. 1604830 made from a laminate of 30–50 gsm paper bonded to a 25–50 micron polyalkylene film bearing pores of 0.5–2 mm diameter at a pore density of 5000–20,000 pores/m². This material is a solid, non-insulating fabric which is not grease-retaining.

By the use of paper for the first layer and of thermoplastic material for the second layer, it is possible to provide a sheet wrapping material which has good insulating properties akin to those possessed by known insulating sheet materials made from two layers of thermoplastic material, and yet which also possesses the deadfold characteristic and other beneficial properties of paper.

The sheet material of the invention is particularly intended for the wrapping of hot food, especially items of "fast" food such as hamburgers in rolls, pizza pies, fish and chips, where paper is normally used.

The problem with much food of this type, is that it is both moist and greasy. Hot water vapour must be allowed to escape or otherwise crisp foods such as chips (french fries) and pizzas become soggy and unpleasant. Similarly, the grease and oil must not be allowed to escape through the package and cause staining of clothes, bags etc. In addition the food must be kept as hot as possible while it is wrapped. A further requirement is that the wrapping material should possess deadfold characteristics so that the wrapped package does not need fastening to prevent its coming undone.

Thermoplastic films are ideal for containing the grease, but often do not possess deadfold characteristics. They do not let the food "breathe". Paper and card absorb grease and can transmit it unless many layers are used. Both types of material tend to be a problem in disposal, because of their bulk. There is thus a need for a material which can be used to wrap foods without fastening, which is insulating and grease proof, which is easily disposed of and, preferably, which can allow steam to escape.

According to the present invention, there is provided a laminated wrapping sheet material comprising a layer of paper of 15–35 gm$^{-2}$ (gsm) gauge discontinuously bonded to a layer of thermoplastic film of 8–35 microns gauge such that pockets of air are defined between the layers.

For greasy items, the thermoplastic material should preferably form the inner surface of any package and in general this arrangement is preferred. However, in certain circumstances the use of the paper layer as the inner surface is desirable. In order to ensure that the sheet material is employed in the desired manner for wrapping food, it can be arranged that any printed matter is printed so that the user will in normal use either consciously or unconsciously wrap items with the paper layer in the appropriate position.

The paper used for sheet material of the invention is extremely lightweight paper.

As stated above, the paper should be below 35 and preferably below 20 gsm and a weight of about 15–20 gsm is suitable. The paper should be a smooth calendared paper of low bulk rather than a soft, loose tissue. A typical paper of use is machine glazed kraft or sulphite of 17 gsm. Where the paper has a smoother "glazed" surface on one side, that surface is desirably arranged on the outside of the laminate.

Pockets of air are formed between the thermoplastic film and the paper by discontinuous bonding. Thus, for example, adhesive is applied on some parts of the surface so that other areas remain unbonded. Sufficient air can be entrapped to provide useful insulation properties by ensuring that the layer of adhesive applied is suitably thick. However, it is much preferred to entrap air by embossing the paper to provide raised areas which do not contact the thermoplastic film. The thickness of the adhesive is then unimportant and, indeed, melt-bonding of the thermoplastic material can be used. The embossing may comprise a regular or irregular array of raised areas, for example a net work of intersecting lines. In a particularly preferred embodiment the embossing is in the form of regular corrugations, leading to narrow channels of entrapped air between lines of bonding. In this embodiment the strength of the laminated material is especially high. The pockets of air are preferably kept as small as possible to improve the handling characteristics and strength. For example, the narrow channels are preferably 1–5 mm wide, e.g. 2 mm wide, and 0.1 to 1 mm deep. Extra strength and rigidity can be provided by the thermoplastic material. The thermoplastic film used in the laminated sheet material is suitably a polyolefin film of 8–35, preferably 8–25 microns gauge, especially polyethylene or polypropylene. High density polyethylene is preferred. As indicated above, the film can be adhesive-bonded or melt-bonded to the paper. The thermoplastic layer can have surface irregularities in order to improve the insulation. For example, the preferred material is a foamed polyethylene film having a randomly irregular surface, particularly a foamed high-density polyethylene. However, the plastics material need not be produced by foaming and need not have random surface irregularities. The paper layer can have surface irregularities instead of or as well as the thermoplastic layer. A particularly preferred film material is of the type produced according to British Pat. No. 1,525,244 of Bakelite Xylonite Limited, corresponding to U.S. Pat. No. 4,264,672. This is a stretched polyolefin film comprising a uniform cellular structure produced by using a blowing agent and consisting essentially of a crystalline linear polyolefin having a broad molecular weight distribution and a low Melt Flow Index, comprising no more than 14% by volume of closed cells, the cell volume being not greater than 10$^{-4}$ ml.

As it is most desirable for the sheet material to be impervious to grease, yet permeable to steam, it is a preferred feature of the invention that the sheet material can be provided in the thermoplastic film layer only, with micro-perforations, at least in certain localised areas. Thermoplastic films of the type used, especially the foamed polyethylene, can be readily perforated, e.g. by an electric arc at any time up to lamination. For example, the sheet material can be provided with strips of perforations arranged to coincide with the top or sides of an intended package (e.g. a wrapped hamburger bun) so that steam can escape from the top or sides while any grease is still retained in the bottom. Similarly a pattern of perforated areas can be formed on the sheet material for cutting into bag blanks, so that bags may be formed which are only perforated near the top. Furthermore, microperforations enable one to create open air pockets in the laminate which will entrap air and thereby improve the insulating effect, particularly when the micro-perforated layer is used innermost for wrapping.

Furthermore, for the insulating sheet materials of the invention, it is possible to make use of foamed thermoplastic material with some closed and some open cells. The open cells then act like microperforations and allow transmission to vapour but still maintain an effective grease barrier. Thus, the foamed plastics material are particularly suited for use in place of the micro-perforated layers and can be used as one or more layers of the laminates of the invention.

Where a glue layer is employed in an insulating sheet material of the invention, the glue may have random or regular discontinuities. The discontinuities can arise through surface irregularities in one or more of the other layers of the sheet material, thereby creating imperfections either in the application or adhering of the adhesive layer. More preferably, however, the adhesive can itself be applied in a discontinuous array, for instance by offset printing a pattern of glue onto the paper or film.

If desired, the insulating and other properties of the sheet materials of the invention can be modified, for instance by including a further layer although it is desirable to keep the bulk of the material as low as possible. Another possibility is to give an exposed thermoplastic or paper layer a further metalized coating. Such a coating is preferably deposited by a conventional vacuum metalization procedure.

The sheet material of the invention typically have good insulating properties and are suited for packaging of hot or cold food items. Furthermore, it has a much higher bulk than the equivalent gauge of paper and can be compressed to a half or even to a third or a quarter of its original volume when being disposed of.

The sheet material can be used as it is, or it can be formed into bags. A particularly preferred form of bag for fast food has a captive flap at the bag opening, (a captive flap being a flap secured to the sides of the bag). Conventionally a captive flap is formed on one of the outer faces of a bag by heat-sealing the thermoplastic material. In using a bag with a captive flap, the item to be packaged is placed in the bag and then the flap is inverted over the opening of the bag. Captive flap bags are normally formed in thermoplastic film material by a folding and heat-sealing operation. For example, the film is folded double on one fold line with one side longer than the other. The longer side is folded back on a second fold line to form the flap, so that the second fold line is superimposed on the edge of the shorter side. Heat sealing of the edges transverse to the folds then seal the two sides together and also seals the flap to the side on which it lies. This method cannot be used if the outer surface of the bag is not heat sealable, for example if it is paper or a metal foil. For paper an adhesive would be needed, leading to a double sealing process—heat for the inner surface and adhesive for the outer surfaces. It has been necessary therefore to provide a captive flap bag which can be constructed from the sheet material of this invention by simple one-step heat sealing.

According to a further feature of the invention there is provided a captive flap bag formed of a paper-thermoplastic film laminate and comprising two superimposed walls with thermoplastic film on the inside, closed at the bottom and on each of the two side edges, and open at the top edge, at least one wall having a reflex internal flap along the top edge sealed at each of the side edges, to define an internal inverted pocket, the two walls not being sealed to each other in the region of the pocket or pockets. In use, an unpocketed top edge or one of the pocketed flaps can be tucked into the pocket of the other wall to form an effective seal with good rigidity.

Figure 2:
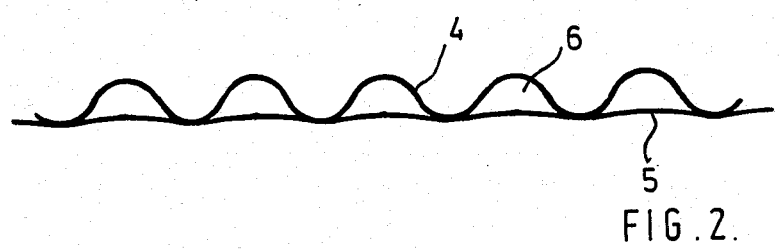

A particularly preferred embodiment of the sheet material of the invention, and a method of manufacture will now be described with reference to the accompanying drawings in which FIG. 1 is a diagrammatic view of a nip roller assembly and FIG. 2 is a section through the sheet material itself.

A longitudinally ridged roller 1 is arranged to rotate against a resiliently deformable nip roller 2 and against a rigid non-deformable nip roller 3. Paper 4 (17 gsm machine glazed kraft) is crimped by being passed around the nip roller 2 and between the nip roller 2 and the ridged roller 1. The crimped paper is allowed to follow the ridged roller 1 and pass through the nip provided by the rigid nip roller 3, where it is joined by thermoplastic film 5 (11-15 micron foamed high density polyethylene) which is coated with adhesive, the film 5 being tensioned such that the film 5 is bonded to raised areas of the crimped paper 4 and not to depressed areas. The emerging laminate has a cross-section as represented in FIG. 2, where the paper 4 and film 5 have trapped between them linear air pockets 6. The crimp of the paper 4 provides good strength and handling characteristics, while the low bulk of the materials means that the laminate can be compressed to a volume at least two times smaller than is possible with plain paper of equivalent thickness.

Figure 3:
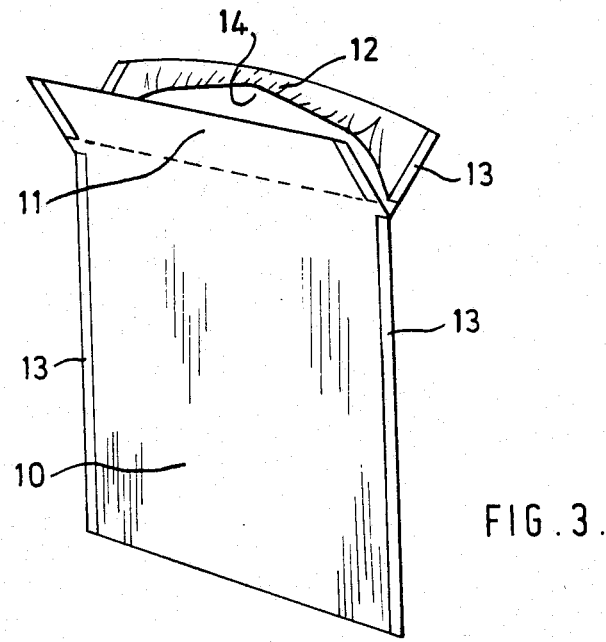

An embodiment of the bag with first and second independent captive flaps is also shown in the accompanying drawings, wherein FIG. 3 is a perspective view.

The bag 10 shown in the drawing is made from the sheet material of the invention, which has one surface that can be welded to itself and one surface which cannot. Thus, the bag is of laminate material comprising a thermoplastic layer and a paper layer, with only the plastics layer being weldable.

The bag 10 has first and second superimposed independent captive flaps 11 and 12 respectively. These flaps 11, 12 are at the opening of the bag and extend across respective major walls of the bag forming inverted pockets 14. The captive flaps 11, 12 are inwardly turned. The weldable surface of the sheet material is innermost.

Manufacture of the bags 10 can be effected by simple folding and welding of a suitable sheet of material. The sheet is folded in half to form the major walls of the bag and then folds parallel with the first fold are made so as to fold inwardly the material at the edges in order to create flaps which will be rendered captive. Given that the weldable surface is innermost, the folded material can be welded along the edges at right angles to the folds, forming the weld lines 13 shown in FIG. 1. Weldable surfaces of the sheet material which are superposed by virtue of the folding will weld one to the other, but no welding will occur where non-weldable surfaces are adjacent.

Thus, considering one edge of the bag, a weld line 13 seals one major wall to the other as far as the commencement of the captive flap 11 or 12. The weld line then internally welds the material of the captive flap 11 and of the captive flap 12, but does not seal the captive 11 to the captive flap 12 since there is no available weldable material to effect such a join. It will be appreciated that two superimposed flaps are preferable. If only one wall of the bag carries an inner flap, the opposing wall might become welded right up to the top, because even though it was opposite a paper surface it could bond to it. In that case, the non-flapped edge could not be tucked into the opposing pocket. However, provided adhesion between the inner thermoplastic film and inturned paper is avoided, this form of bag can be used.

I claim:

1. A laminate wrapping material comprising a sheet of smooth, calendared on at least one side, machine-glazed kraft or sulphite paper in the order of 15 to 35 grams per square meter, and a coextensive sheet of thermoplastic film in the order of 8 to 35 microns in thickness discontinuously attached to each other at regular or irregular intervals along lines of bonding such as to define between the sheets a plurality of channels or pockets on the order of 1 to 5 millimeters in width in the plane of the laminate isolated from one another by said lines of bonding, said paper sheet embodying deadfold characteristics of such magnitude as to impart deadfold characteristics to the composite laminate and said thermoplastic film containing microperforation of such magnitude as to permit transmission of water vapor and hot air through the laminate and to constitute a barrier to the transmission of grease through the laminate and wherein at least some of the microperforations perforate the thermoplastic film into the channels or pockets.

2. A bag formed of a laminate according to claim 1 folded to form spaced, parallel panels joined at one end and at two opposite edges to define a first pocket closed at the bottom and sides and open at the top, said opposite edges being joined by folding of the edges of one of the panels about the edges of the other panel into overlapping relation to said other panel and adhered thereto and unattached extensions of the panels at the open top, one of which is bent inwardly double upon itself along a line parallel to the bottom and sealed at its opposite edges to itself such as to define at the inner side above the first pocket between the panels a second pocket open adjacent the open end of the first pocket within which the extensions at the upper end of the other panel is adapted to be inserted to provide, in conjunction therewith, a closure for the open end of the first pocket.

3. A bag according to claim 2 wherein the panels are disposed with the paper sheet at the inner side of the first pocket.

4. A bag according to claim 2 wherein the thermoplastic sheet is disposed at the inner side of the bag.

5. A laminate wrapping material comprising a sheet of smooth, calendared on at least one side, machine-glazed kraft or sulphite paper in the order of 15 to 35 grams per square meter, and a coextensive sheet of thermoplastic film in the order of 8 to 35 microns in thickness discontinuously attached to each other at their interfaces by bonding to provide attached and unattached areas, said unattached areas defining pockets and said bonded areas being interconnected such as to isolate the pockets from each other and said pockets being in the order of 1 to 5 millimeters in width in the plane of the laminate, said paper sheet embodying deadfold characteristics of such magnitude as to impart deadfold characteristics to the composite laminate and said thermoplastic film containing microperforations of such magnitude as to permit transmission of water vapor and hot air through the laminate and to constitute a barrier to the transmission of grease through the laminate and wherein at least some of the microperforations perforate the thermoplastic film into the pockets between the sheets.

6. A laminate of insulated wrapping material comprising a sheet of smooth, calendared on at least one side, machine-glazed kraft or sulphite paper in the order of 15 to 35 grams per square meter and a coextensive sheet of thermoplastic film in the order of 8 to 35 microns in thickness and means bonding the paper sheet to the film at their interfaces at regular or irregular intervals such as to define at the interfaces a plurality of sealed and unsealed areas wherein the unsealed areas define finite air pockets isolated from each other by the intervening sealed areas and wherein the pockets are in the order of 1 to 5 millimeters in breadth in the plane of the laminate, wherein the paper sheet constitutes an absorbent sheet and the thermoplastic film sheet constitutes a substantial barrier to the passage of grease therethrough but is pervious to water vapor and hot air and wherein the paper sheet embodies deadfold characteristics of such magnitude as to impart deadfold characteristics to the composite laminate.

7. A bag formed of a laminate according to claim 6 disposed to form spaced, parallel panels joined at one end and at two opposite edges to define a first pocket closed at the bottom and sides and open at the top, said opposite edges being joined by folding of the edges of one of the panels about the edges of the other panel into overlapping relation to said other panel and adhered thereto and unattached extensions of the panels at the open top, one of which is bent inwardly double upon itself along a line parallel to the bottom and sealed at its opposite edges to itself such as to define at the inner side above the first pocket between the panels, a second pocket open adjacent the top end of the first pocket within which the extensions at the upper end of the other panel is adapted to be inserted to provide, in conjunction therewith, a closure for the open end of the first pocket.

8. A bag according to claim 7 wherein the panels are disposed with the paper sheet at the inner side of the first pocket.

9. A wrapping material according to claim 1 wherein one of the sheets is corrugated and the apices of the corrugations are bonded to the other sheet.

10. A wrapping material according to claim 1 wherein the thermoplastic sheet is a polyolefin.

11. A wrapping material according to claim 1 wherein the thermoplastic sheet is a foam polyethylene.

* * * * *